J. R. SAPP, H. CLAY & W. FROST.
CORN-PLANTER.
No. 178,471. Patented June 6, 1876.
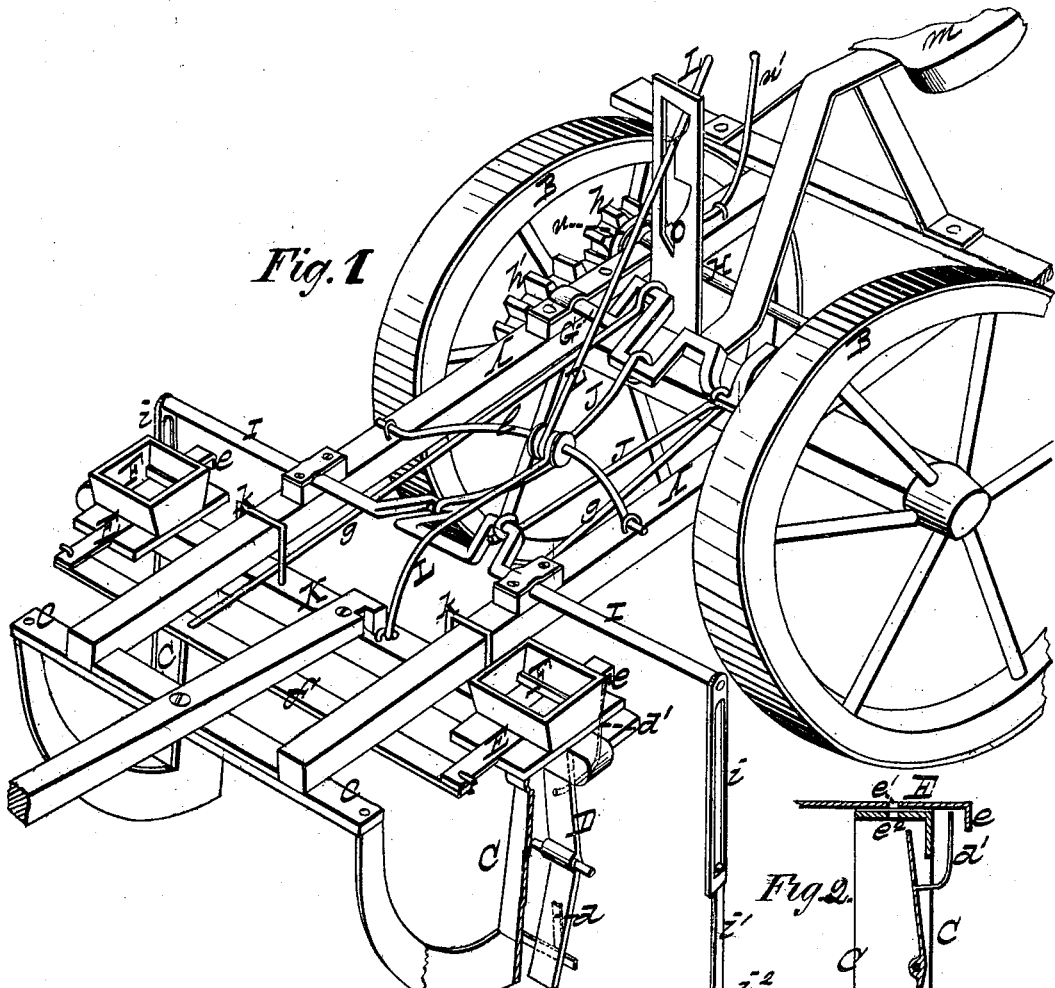
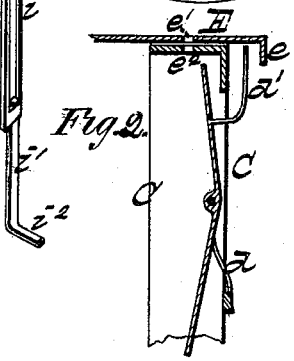
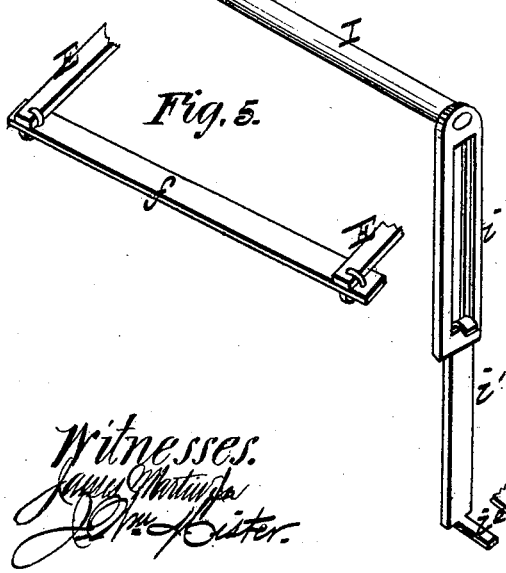
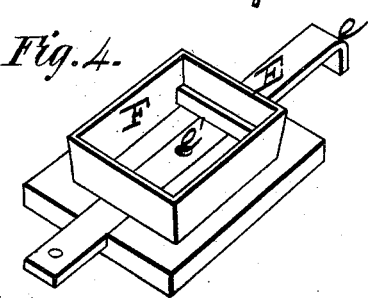
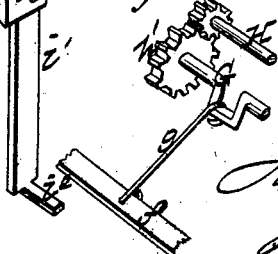
Witnesses. Inventors

UNITED STATES PATENT OFFICE.

JOSEPH R. SAPP, OF DANVILLE, OHIO, AND HENRY CLAY AND WILLIAM FROST, OF STEWART, IOWA.

IMPROVEMENT IN CORN-PLANTERS.

Specification forming part of Letters Patent No. 178,471, dated June 6, 1876; application filed March 30, 1876.

*To all whom it may concern:*

Be it known that we, JOSEPH R. SAPP, of Danville, Knox county, State of Ohio, and H. CLAY and WM. FROST, of Stewart, in the county of Guthrie and State of Iowa, have invented certain new and useful Improvements in Corn-Planters; and we do hereby declare the following to be a full, clear, and exact description thereof, which will enable others skilled in the art to which it appertains to make and use the same, reference being had to the accompanying drawings, and to the letters of reference marked thereon, which form a part of this specification, and in which—

Figure 1 is a perspective view of our improved corn-planter; and Figs. 2, 3, 4, 5, and 6 are detached views thereof.

Corresponding parts in the several figures are designated by like letters.

This invention relates to a certain improvement in corn-planters; and it consists of the corn-dropping-regulating mechanism, consisting of a bowed or curved plate in the leg of the openers, its lower end closing the lower end of said leg by a spring, and its upper end projecting outside of the leg, and having an arm struck by a pendant of the seed-slide, substantially as hereinafter more fully set forth.

In the annexed drawing, A refers to a frame, mounted at its rear end upon wheels B B, and at its forward end upon the legs of the openers or runners C C. The ends of the curved portions of the openers or runners C C are fastened to and connected together by a bar, $c$, suitably hinged to the forward end of the frame A. In the leg of each of the openers is a bowed or curved plate or valve, D, fulcrumed therein at about its middle, and having its lower end pressed against the inside of the forward portion of the leg by a spring, $d$, closing the said end of leg, and its upper end provided with an arm, $d'$, to be struck by the dependent portion $e$ of the slide E, duplicated and passing through the corn-receptacles F F, the opposite ends of said slides being attached to and connected together by a bar, $f$. From this bar $f$ extend rods $g$ $g$, connected to cranks upon the shaft G, having a pinion or cog gearing with a pinion upon an axis, H, having a second pinion or cog, $h$, gearing with a cog, $h'$, upon the axle of the transporting and driving wheels B B, for imparting motion to the slides E E, and operating the valves D D in dropping the corn. The slides E E are each provided with an orifice, $e^1$, registering with an orifice, $e^2$, in the legs of the openers C C when the valves D D are closed, to drop the corn into the said legs, from which it is discharged or dropped into the ground when the said orifices are out of line with each other and the valves opened. I is an axis journaled upon the frame A, and provided with cranks, connected by rods J J to cranks upon the shaft G, for imparting motion to the said axis. To the ends of the axis I are attached arms $i$ $i$, having sockets to receive and permit of the projection and retraction of the sliding bars $i^1$ $i^1$ while the axis I is rotated, to permit of the marking of the ground, when the arms of the said axis point downward, at the intervals it is desired to plant the corn apart, the sliding bars $i^1$ $i^1$ being provided with angular projections $i^2$ $i^2$, to make the marks in the plowed ground. The sliding or expansible bars $i^1$ $i^1$ have both a rotary and vertical movement, to knock the adhering dirt therefrom, and thus cause the same to properly perform their work. The bar $c$, connecting the forward end of the runners or openers C C together, being hinged to the frame A, and the staples $k$ $k$ connecting the bar K, supporting the corn-receptacles F F, to said frame, and to which the legs of the said openers are attached, being elongated, by which they loosely embrace the longitudinal bars of the said frame, pressure can be exerted upon the openers, to cause them to enter the plowed ground, by lowering the same or causing the weight of the forward end of the frame, &c., to rest thereon. A lever, L, attached to the frame $c$ K of the openers, and fulcrumed to a cross-bar, $l$, of the frame A, and extending back within convenient reach of the driver or operator mounted upon the seat $m$, enables the openers or runners to be lifted out of the ground when desired. A clutch, $n$ $n$, having a lever, $n'$, within convenient reach of the operator, permits of throwing the operative mechanism out of gear, to stop the dropping of the corn. To retain the lever L in position when the openers or runners are elevated, a notched stand or bar, o, may be fixed to the frame A.

Having thus described our invention, what we claim, and desire to secure by Letters Patent, is—

1. The leg or opener C, having the bowed or curved plate or valve D, closing the lower end of said leg by a spring, d, and provided at its upper end with an arm, d', in combination with and struck by a pendant, e, of the seed-slide E, substantially as and for the purpose set forth.

2. The crank-shaft G, rods g, and bar f, attached to, and in combination with, the seed-slides E, having the pendants e, bowed or curved plates D D in the legs or openers C C, and having the arms d and springs d' d', substantially as and for the purpose set forth.

In testimony that we claim the foregoing as our own we hereunto affix our signatures in presence of two witnesses.

JOSEPH R. SAPP.
HENRY CLAY.
WILLIAM FROST.

Witnesses:
GEORGE GRAY,
J. B. BLANCHARD.